United States Patent [19]

Grants et al.

[11] 4,281,392
[45] Jul. 28, 1981

[54] MEMORY CIRCUIT FOR PROGRAMMABLE MACHINES

[75] Inventors: Valdis Grants, Lyndhurst; Ron Schultz, Willoughby; Timothy E. McAdams, Willowick, all of Ohio

[73] Assignee: Allen-Bradley Company, Milwaukee, Wis.

[21] Appl. No.: 35,068

[22] Filed: May 1, 1979

[51] Int. Cl.³ .................. G06F 13/06; G11C 5/06; G11C 7/00; G11C 9/00
[52] U.S. Cl. ............................................. 364/900
[58] Field of Search ... 364/200 MS File, 900 MS File; 371/21; 324/73 R

[56] References Cited

U.S. PATENT DOCUMENTS

| | | | |
|---|---|---|---|
| 3,967,251 | 6/1976 | Levine | 364/200 |
| 3,969,618 | 9/1976 | Strubel et al. | 371/21 |
| 4,025,903 | 5/1977 | Kaufman et al. | 364/200 |
| 4,055,802 | 10/1977 | Panousis et al. | 371/21 |

*Primary Examiner*—Gareth D. Shaw
*Assistant Examiner*—C. T. Bartz
*Attorney, Agent, or Firm*—Quarles & Brady

[57] ABSTRACT

A memory circuit receives memory modules which may vary in their size and their type. The memory circuit includes a decoder circuit which receives size feedback signals from each memory module which enables it to automatically assign each module the address space it requires. If the size of a memory module is changed, the decoder circuit reassigns the address space to accommodate the new module. Type feedback signals generated by each memory module enable the memory circuit to apply the proper control signals and enable the proper supporting circuitry when the memory module is addressed.

9 Claims, 4 Drawing Figures

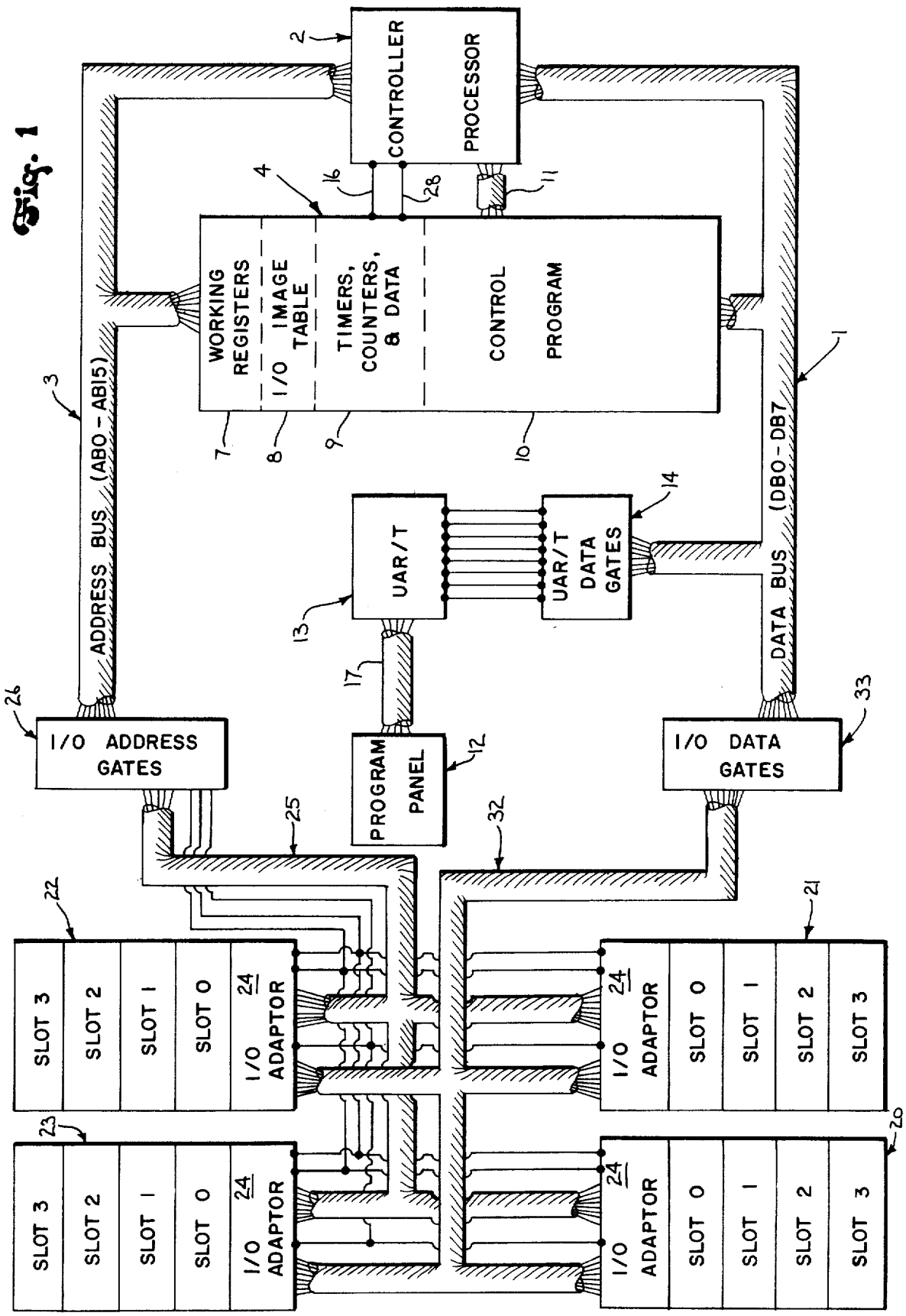

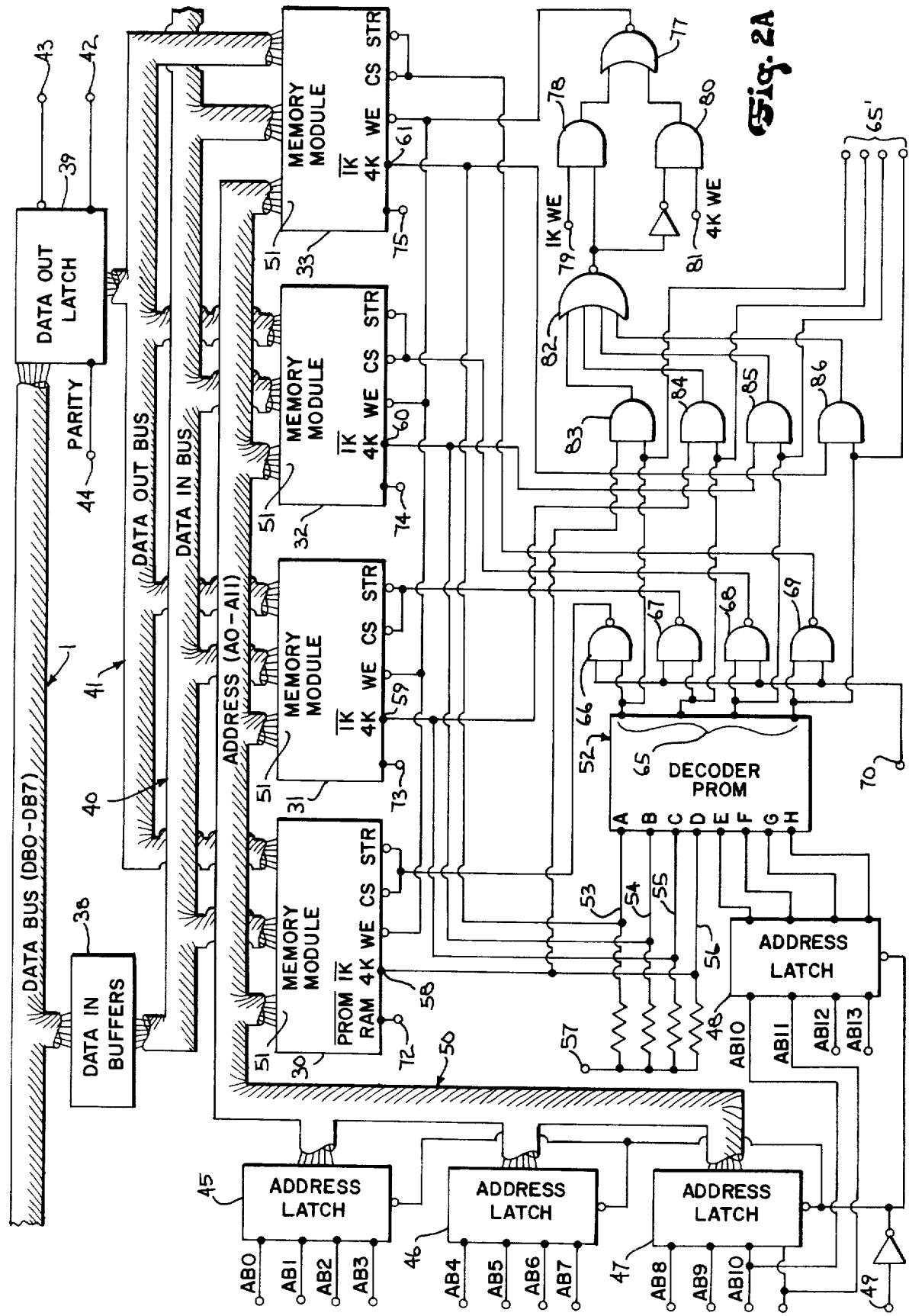

MEMORY CIRCUIT FOR PROGRAMMABLE MACHINES

BACKGROUND OF THE INVENTION

The field of the invention is programmed machines which store programs and other data in addressable memory devices, and particularly, machines in which the user can readily add or exchange memory devices of various sizes and types.

In programmable machines such as programmable controllers the user employs a program panel to develop a control program which is stored in a memory device such as a random access memory (RAM) or a read-only memory (ROM). The control program which is developed may be very short in some applications (less than 1K memory lines) while in other applications it may become quite lengthy (16K memory lines or more). Also, some portions of the control program may be fixed, and thus suitable for employing read-only memory devices, whereas other portions may undergo periodic change and be more suitably stored in read/write memory devices. It is desirable, therefore, to allow the user flexibility in the size of the memory he may use and the type of memory devices he may employ.

Nearly all programmed machines have a limited amount of address space and most of this space is occupied by memory devices. In both microprocessor-based and minicomputer-based machines, for example, a 16-bit address bus is employed which provides a 64K address space. Although address expansion techniques are well known, these require additional hardware and more execution time. In providing a flexible system in which the user may interchange memory devices of varying sizes, therefore, it is important that the available address space be efficiently used.

SUMMARY OF THE INVENTION

The present invention is a memory circuit for a programmable machine in which memory devices in the form of memory modules of various sizes and types may be used without alteration of the circuit. More specifically, the memory circuit includes a decoder circuit which connects to selected leads in the machine's address bus and which connects to size feedback lines that connect to the memory modules and which indicate to the decoder circuit the size of the memory modules being used. The decoder circuit is responsive to signals on the machine's address bus to provide signals which enable the memory modules in such manner that they occupy a contiguous address space regardless of the size of the memory devices employed in them. Also, gates are provided for receiving signals from each memory module on type feedback lines and for enabling the proper supporting circuitry for each memory module as it is addressed.

A general object of the invention is to provide a memory circuit into which memory modules of differing sizes can be inserted without alteration of the circuitry or waste of address space. When a memory module is inserted in place of a memory module of larger size, the size feed-back signal which it generates alters the decoder circuit operation such that the address space allocated to other memory modules is shifted to close the gap in address space which would otherwise occur. On the other hand, if a small memory module is replaced by a larger memory module, the size feedback signal which it generates causes the decoder circuit to enlarge the address space gap to the required size.

Another object of the invention is to provide a memory circuit into which memory modules of differing types can be inserted without alteration of the circuitry. When a random access memory module is inserted in place of a read-only memory module, the type feedback signal which it generates enables parity circuitry. The parity circuitry includes a parity generator which writes a parity bit into the random access memory during write operations and which checks the parity of data read from the random access memory. Ths circuitry is automatically disabled when a read-only memory is employed.

Another object of the invention is to enable memory modules of differing sizes and types to be intermixed in the same memory circuit. The feedback signals generated by each memory module indicate to the circuitry its size and type, and the circuitry automatically allocates the proper amount of address space and enables the proper control signals and supporting circuitry when the memory module is addressed.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is an electrical block diagram of a programmable controller which employs the memory circuit of the present invention;

FIGS. 2A and 2B are electrical schematic diagrams of the memory circuit which incorporates the present invention.

DESCRIPTION OF THE PREFERRED EMBODIMENT

Figure 2B:
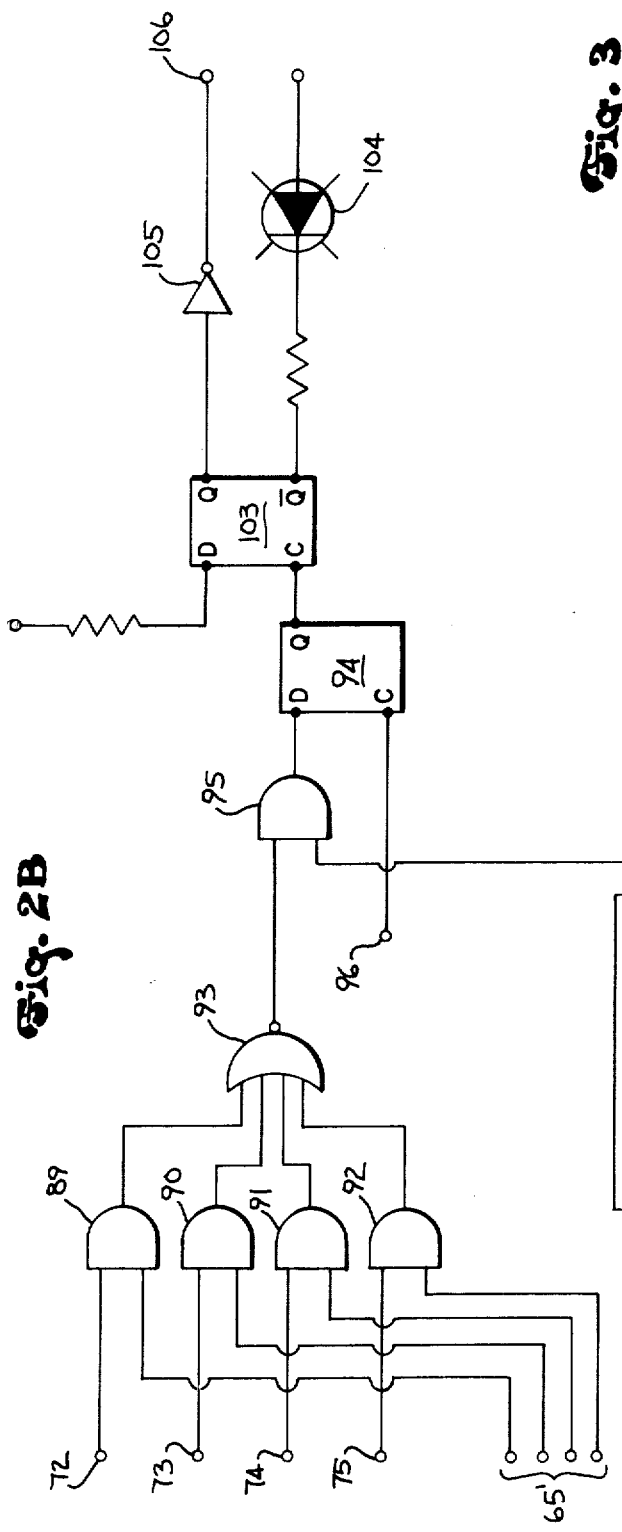

The memory circuit of the present invention is employed in a programmable controller. Referring to FIG. 1, this programmable controller is structured around an eight-bit bidirectional data bus 1 and includes a controller processor 2 which directs the flow of data thereon by means of control lines and a sixteen-bit address bus 3. A memory circuit 4 connects to both the data bus 1 and the address bus 3 and an eight-bit data word may be written into an addressed line or read out of an addressed line of the memory 4 in response to control signals applied to "data strobe" and "WE" control lines 16 and 28. The memory 4 may include anywhere from 1K to 16K lines of memory which store working registers 7, an I/O image table 8, a timers, counters and data storage 9 and a control program 10.

The control program portion 10 of the memory circuit 4 stores a series or programmable controller type instructions such as those defined in U.S. Pat. No. 3,942,158. Each controller instruction is stored on two 8-bit memory lines and when it is read out through the data bus 1 to the controller processor 2, an operation code therein directs the processor 2 to perform a designated function. The control program is prepared and entered into the memory circuit 4 by the end user and the size of the memory circuit 4 will, therefore, depend upon the length of the user's control program.

The control program is loaded into the memory circuit 4 and edited by means of a program panel 12 which couples to the data bus 1 through a universal asynchronous receiver/transmitter (UAR/T) 13 and a set of bidirectional data gates 14. Data is received from the program panel 12 serially through a cable 17 and the received eight-bit word is gated onto the data bus 1 by the UAR/T 13 and data gates 14. Such data may include control program instructions to be stored in the memory circuit 10 or edit commands. Data is also gated from the data bus 1 to the UAR/T 13, and this data is latched in the UAR/T 13 and serially transmitted to the program panel 12. Such output data may include control program instructions stored in the memory circuit 4. Such data is processed by the program panel 12 to display a "rung diagram" that visually indicates to the user the functions which are carried out by the control program.

The programmable controller is connected to the machine, or system being controlled, through I/O interface racks 20-23. Each interface rack 20-23 includes an I/O adapter card 24 and up to eight eight-bit input or output cards (not shown in the drawings) that are received in four slots 0-3. That is, each slot 0-3 may include two eight-bit I/O modules, or cards—a low and a high. Each input card contains eight input circuits for receiving digital signals that indicate the status of sensing devices such as limit switches on the machine being controlled, and each output card contains eight output circuits for controlling operating devices on the machine such as motor starters and solenoids. Input and output circuits illustrated in respective U.S. Pat. Nos. 3,643,115 and 3,745,546 may be employed for this purpose although numerous circuits are available to interface wih the many types of sensing devices and operating devices which may be encountered in industrial application.

Data is coupled to or from a particular card in one of the I/O interface racks 20-23 by addressing it through a five-bit I/O address bus 25. Two bits select the appropriate I/O interface rack 20-23 and the remaining three bits identify the card being addressed. The I/O adapter card 24 on each I/O interface rack 20-23 includes means for recognizing when its rack is being addressed (not shown in the drawings) and it includes a three-bit decoder (not shown in the drawings) for enabling the appropriate card. Reference is made to U.S. Pat. No. 4,118,792 entitled "Malfunction Detection System for a Microprocessor Based Programmable Controller" for a more detailed description of the I/O adapter cards 24.

Data is coupled between the controller processor 2 and the I/O interface racks 20-23 through an eight-bit I/O data bus 32 and a set of eight I/O data gates 33. When a read operation is performed, eight bits of data are gated onto the I/O data bus 32 by the addressed I/O card and this data is coupled to the data bus 1 by the I/O data gates 33. Conversely, when a write operation is performed, an eight-bit output data word is coupled from the controller processor 2, through the I/O data gates 33 and to an addressed output card in one of the I/O interface racks 20-23.

The control program stored in the memory circuit 4 is repeatedly executed, or scanned, by the controller processor 2 when in the "run" mode. Each scan through the control program requires approximately twenty milliseconds (the exact time depends on the length of the control program and the types of instructions contained therein) and after each such scan, an I/O scan routine is executed to couple data between the I/O interface racks 20-23 and the I/O image table 8 in the memory circuit 4. The I/O image table 8 stores an input status data word and an output status data word for each I/O card in the interface racks 20-23. Each data word in the I/O image table 8 is thus associated with a specific card in one of the I/O interface racks 20-23. Each input status word is an image of the state of eight sensing devices connected to its associated I/O card and each output status word is an image of the desired state of any operating devices connected to its associated I/O card.

The I/O scan is made after each scan, or execution, of the control program stored in the memory circuit 4. The I/O scan is a programmed sequence in which output status words are sequentially coupled from the I/O image table 8 to their associated I/O cards and input status words are sequentially coupled from the I/O cards to their associated memory locations in the I/O image table 8. The I/O scan is performed once every control program scan (approximately once every twenty milliseconds) and thus the I/O image table 8 is kept up to date with changing conditions on the machine or process being controlled.

The controller processor 2 operates on data in the I/O image table 8 rather than data received directly from the I/O interface racks 20-23. This allows the processor to operate at maximum speed to execute the control program in a minimum amount of time while at the same time minimizing the data rates in the I/O data bus 32 and the I/O address bus 25. The latter consideration is important, since lower data rates allow the use of more effective noise immunity circuits which are so necessary in an industrial environment.

Numerous types of controller processors 2 are known to the art. The hardwired processor disclosed in U.S. Pat. No. 3,942,158 may be employed, the microprocessor based processor disclosed in U.S. Pat. No. 4,118,792 may be employed, or the micro-programmed processor disclosed in copending U.S. patent application Ser. No. 026,012 filed on Apr. 2, 1979 may be employed. Regardless of the type of processor employed, it will generate data on the data bus 1 for storage in the memory circuit 10 and it will read data from the memory circuit 10. The processor 2 also generates an address on the address bus 3 to select a line in the memory circuit 4 from which data is to be read or into which data is to be written and it generates the necessary control signals on the control bus 11.

Figure 3:
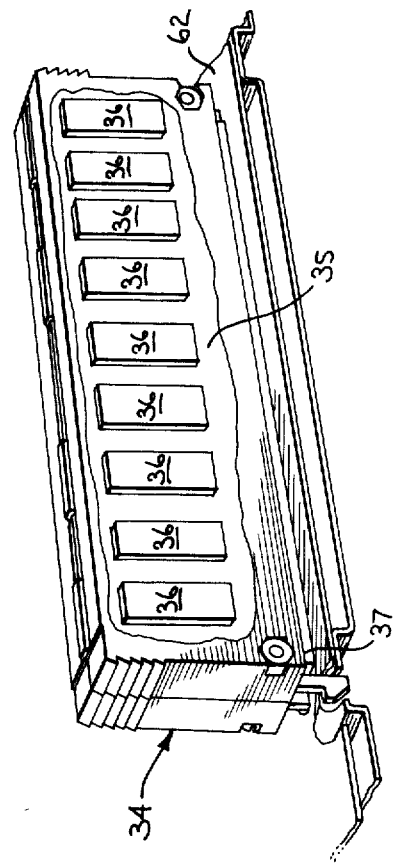
FIG. 3 is a perspective view with parts cut away of a memory module which forms part of the circuit of FIG. 2A.

Referring to FIGS. 2 and 3, the memory circuit of the present invention is physically located on a separate circuit board that is accessible to the user. Four memory modules 30-33, each containing memory devices of a fixed size and type may be plugged into the memory circuit 4. Each memory module 30-33 includes an insulating case 34 that encloses a circuit board 35 which is received in an edge connector 37 on the main memory circuit board 62. The module circuit board 35 will receive nine one-bit by 1K or one-bit by 4K memory chips mounted in dual-in-line packages 36. Eight of these memory chips store data and the ninth stores a parity bit, therefore, the ninth memory chip is not required when read-only memory chips are employed. The memory chip leads are soldered to metal foils on the module circuit board 35 which in turn connects them to terminals on the edge connector 37. These connections will vary depending upon the size and type of memory chips used, however, the terminals on all four edge connectors serve the same functions so that modules are interchangeble. For a detailed description of the memory modules 30-33, reference is made to U.S. Pat. No. 4,138,711, issued on Feb. 6, 1979, and entitled "Static Control Device for Printed Circuit Package."

Referring particularly to FIGS. 2A and 2B, each memory module 30-33 is coupled to the 8-bit data bus 1 through data in buffers 38 and a data out latch 39. The eight leads in the data bus 1 connect through the data in buffers 38 to corresponding leads in a data in bus 40 and the eight leads in the data in bus 40 in turn connect to the "data in" terminals on each of the four edge connectors 37. The circuit board 35 within each memory module 30-33 makes the connections between these eight data in terminals and the data input lead on each of the eight memory chips 36. A ninth lead in the bus 40 is driven by a parity generator and it connects to the ninth memory chip 36 in each memory module 30-33. It should be apparent that the physical layout of the main memory circuit board 62 need not be changed to accommodate memory chips of various types. Instead, regardless of the pin arrangement on the memory chips 36, the memory module circuit board 35 is constructed to make the necessary connections to the data in bus 40.

The data out latch 39 receives output data read from the memory modules 30-33 through a data out bus 41 which connects to each of the four edge connectors 37. Eight leads in the data out bus 41 carry data, and the ninth is a parity bit. This data is latched in the data out latch 39 when a logic high voltage is applied to a control lead 42 and the eight data bits are then generated on the data bus 1 when a logic low voltage is applied to a control line 43. The parity bit is also stored in the data out latch 39, but it is generated on a parity line 44.

The address space occupied by the memory circuit can range from 4K to 16K. To address a location, or memory line, in this address space, leads AB0-AB13 in the address bus 3 are connected to inputs on four 4-bit address latches 45-48. An address on the controller address bus 3 is stored in these latches 45-48 when a logic high voltage is applied to a control line 49. The twelve outputs from address latches 45-47 connect through a bus 50 to twelve address input terminals 51 on each memory module 30-33. The 12-bit address on this bus 50 can select one of 4K lines of memory, however, when a memory module 30-33 contains only 1K of memory not all of the bits are used. Instead, the module circuit board 35 is designed to only connect the ten least significant leads (A0-A9) in the bus 50 to the memory chips 36 in that 1K module. It is a principle objective of the present invention that in such case the remaining 3K of address space (represented by bits A10 and A11) is not wasted. This is accomplished in part by connecting address bus leads AB10 and AB11 not only to the latch 47, but also to the address latch 48 along with leads AB12 and AB13.

The four outputs on the address latch 48 connect to the four most significant address terminals on a 256 by 4 decoder PROM 52. The signals on address bus leads AB10-AB13 are thus applied to the decoder PROM 52 which operates as a programmable decoder circuit. The decoder PROM 52 is "programmed" by "memory size feedback signals" which appear on lines 53-56 and which are applied to its four least significant address terminals. The memory size feedback lines 53-56 are pulled to a logic high voltage through resistors connected to a positive d.c. supply terminal 57 and they connect to size terminals 58-61 on the respective memory modules 30-33. When 1K memory chips 36 are employed in a memory module 30-33, its circuit board 35 is wired such that the size terminal 58-61 is connected to circuit ground. On the other hand, when 4K memory chips 36 are employed in a memory module, the size terminal 58-61 is left unconnected and the size feedback line 53-56 to which it connects remains at a logic high voltage. The logic state of the size feedback lines 53-56 thus indicates to the decoder circuit the size of each memory module 30-33 which is employed by the user.

When combined with the most significant address bus leads AB10-AB13, the memory size feedback signals on the lines 53-56 form an 8-bit address which is applied to the decoder PROM 52 and which selects one of its 256 lines. The contents of the selected line is read out at a set of four decoder PROM output terminals 65. A set of four NAND gates 66-69 connect to the decoder PROM output terminals 65 and each of these in turn drives a chip select (CS) and strobe (STR) terminal on one of the respective memory modules 30-33. Second inputs on the NAND gates 66-69 are commonly connected to a STROBE control line 70 which is driven to a logic high voltage after an address is clocked into the address latches 45-48.

The decoder PROM 52 is programmed to generate a logic high voltage at one of the output terminals 65 when it is addressed. As a result, one of the four memory modules 30-33 is enabled through its chip select (CS) and strobe (STR) terminals when an address within the 16K address range of the memory circuit appears on the address bus 3. The particular memory module enabled is determined by address bus leads AB10-AB13 and the state of the size feedback lines 53-56.

The size feedback signals insure that the entire memory space is efficiently used even though 1K and 4K memory modules are intermixed.

Referring particularly to FIG. 2A and Table I, the 16K address space is divided into 1K segments by the address bus signals AB10-AB13 which are applied to the four most significant address input terminals on the decoder PROM 52. For each 1K segment of address space there is an associated set of sixteen lines in the decoder PROM 52 and one of these sixteen lines is selected by the four-bit memory size feedback signal which is applied to the four least signficant address input terminals on the decoder PROM 52. As a result, the memory modules 30-33 occupy a contiguous address space which may vary in size from 4K (i.e., four 1K memory modules) to 16K (i.e., four 4K memory modules).

TABLE I

| DECODER PROM ADDRESS (HEXA-DECIMAL) | CONTENTS |
| --- | --- |
| 00 | 01 01 01 01 01 01 01 01 01 01 01 01 01 01 01 01 |
| 10 | 02 01 02 01 02 01 02 01 02 01 02 01 02 01 02 01 |
| 20 | 04 01 02 01 04 01 02 01 04 01 02 01 04 01 02 01 |
| 30 | 08 01 02 01 04 01 02 01 08 01 02 01 04 01 02 01 |
| 40 | 00 02 02 02 04 02 02 02 08 02 02 02 04 02 02 02 |
| 50 | 00 04 04 02 04 04 04 02 08 04 04 02 04 04 04 02 |
| 60 | 00 08 08 02 08 04 04 02 08 08 08 02 08 04 04 02 |

TABLE I-continued

| DECODER PROM ADDRESS (HEXADECIMAL) | CONTENTS |
|---|---|
| 70 | 00 00 00 02 00 04 04 02 00 08 08 02 08 04 04 02 |
| 80 | 00 00 00 04 00 04 04 04 00 08 08 04 08 04 04 04 |
| 90 | 00 00 00 08 00 08 08 04 00 08 08 08 08 08 08 04 |
| A0 | 00 00 00 00 00 00 00 04 00 00 00 08 00 08 08 04 |
| B0 | 00 00 00 00 00 00 00 04 00 00 00 08 00 08 08 04 |
| C0 | 00 00 00 00 00 00 00 08 00 00 00 08 00 08 08 08 |
| D0 | 00 00 00 00 00 00 00 00 00 00 00 00 00 00 00 08 |
| E0 | 00 00 00 00 00 00 00 00 00 00 00 00 00 00 00 08 |
| F0 | 00 00 00 00 00 00 00 00 00 00 00 00 00 00 00 08 |

WHERE:
01 enables memory module 30
02 enables memory module 31
04 enables memory module 32
08 enables memory module 33

It should be apparent that although the memory circuit of the preferred embodiment occupies up to 16K of address space and accepts only 1K or 4K memory sizes, that the invention may be applied with equal advantage to other configurations. For example, the entire 64K address space provided by the 16-lead address bus 3 may be managed by the circuit of the present invention and other sizes of memory modules can be employed. In either case, the size of the decoder PROM 52 would be expanded to accommodate additional memory modules and more address leads in the address bus 3. Also, where more than two sizes of memory modules are employed, additional size feedback lines would be required from each module to couple the additional information to the decoder PROM 52.

Referring to FIGS. 2A and 2B, either read-only memory chips or static random access memory chips (RAM) can be employed in the memory modules 30-33. This presents two problems which are solved by a set of "type feedback lines" 72-75 that eminate from the respective memory modules 30-33. More specifically, when a RAM chip is employed a write enable input terminal (WE) on each memory module 30-33 must be driven and a parity bit must be generated when data is written into a RAM chip or checked when data is read from a RAM chip. In addition, the timing of the write enable control signal differs when a 4K RAM chip is employed rather than a 1K RAM chip.

Referring particularly to FIG. 2A, the WE control terminals on the memory modules 30-33 are commonly connected to the output of a NOR gate. One input on the NOR gate 77 is driven by a first AND gate 78 that receives a write enable signal on a 1K WE control line 79. The second input on the NOR gate 77 is driven by a second AND gate 80 that receives a write enable signal on a 4K WE control line 81. Both AND gates 78 and 80 are driven by a NOR gate 82 which indicates at any moment in time whether a 1K or 4K memory module is being addressed. This indication is provided by a set of four AND gates 83-86, each of which has one input connected to a size feedback line 58-61 and a second input connected to a decoder PROM output terminal 65. Consequently, when a 1K memory module is enabled by the decoder PROM 52 the AND gate 78 is also enabled and the write enable signal on the 1K WE control line 79 is applied to that memory module. On the other hand, when a 4K memory module is addressed and enabled, the AND gate 80 is enabled and the write enable signal on the 4K WE control line 81 is applied to that memory module. Thus, the size feedback signals are employed to select the appropriate control signals for each memory module 30-33.

Referring particularly to FIGS. 2A and 2B, the type feedback lines 72-75 are applied to the respective input terminals on a set of AND gates 89-92. Second inputs on the AND gates 89-92 connect through lines 65' to corresponding outputs on the decoder PROM 52 and when a memory module containing RAM chips is enabled, one of the AND gates 89-92 is enabled. As a result, a logic low voltage is generated by a NOR gate 93 and applied to one input of an AND gate 95. The output of the AND gate 95 is connected to the D input of a flip-flop 94 and a second input is connected to an "ODD" output on a parity generator 98. The flip-flop 94 is clocked by a signal on a parity strobe control line 96.

The parity generator 98 is a commercially available integrated circuit which has a set of eight data input terminals connected to the eight leads in the data in bus 40. An inverter gate 99 connects to the "EVEN" output 100 on the parity generator 98 and the output of this inverter gate 99 drives the parity bit lead in the data in bus 40. The parity line 44 from the data out latch 39 is coupled to a parity bit input 101 on the parity generator 98 by a NAND gate 102. The parity bit on the line 44 is applied to the parity generator 98 at the same moment an 8-bit byte of data is read out of the data out latch 39 onto the data bus 1.

When data is written into a RAM memory module 30-33, a parity bit is generated by the parity generator at its output 100 and stored with the data. When data is read from a RAM memory module 30-33, the parity bit stored with that data is applied to the input 101 on the parity generator 98. If an error has occurred, the flip-flop 94 is clocked and its Q output goes low to clock a second flip-flop 103. A $\overline{Q}$ output on the second flip-flop 103 drives a light emitting diode 104 to provide a visual indication that a parity error has occurred and a Q output on the flip-flop 103 is coupled through an inverter gate 105 to a parity error control line 106. The line 106 connects to the processor 2 and the parity error signaled thereon generates an interrupt or otherwise halts normal operation of the programmable controller.

The type feedback signals on the lines 72-75 serve to enable the supporting circuitry required by random access memory modules. When a read-only memory module is inserted by the user however, this supporting circuitry is disabled because it would provide incorrect indications. This enabling and disabling of the parity generator circuit occurs automatically and it enables RAM and ROM memory modules to be intermixed.

It should be apparent that the memory circuit of the present invention offers a great convenience to the user by enabling him to insert memory modules 30-33 of varying sizes and types. The circuit automatically accommodates the memory modules and insures that available address space is efficiently used. It should also be apparent that although the present invention is particularly suited for programmable controllers, that it is also useful in other digital systems where memory modules of varying sizes and types are used.

We claim:
1. A memory circuit which comprises:
   a set of memory modules, each module having address terminals for receiving a multi-bit address code, each module having a data terminal, each module having an enable terminal for receiving an enable signal which enables the module to respond to the multi-bit address code and couple data through the data terminal, and each module having means for generating a size feedback signal which is indicative of the number of separate, contiguous addresses required by the memory module; and a decoder circuit having a first input connected to receive at least one bit of the multi-bit address code applied to said memory modules and a set of second inputs each of which second inputs is connected to receive the size feedback signal from a respective one of said memory modules, and in which said decoder circuit includes a set of output terminals, each of which is connected to a respective one of said memory module enable terminals;

wherein said decoder circuit is operable in response to an applied address code and the size feedback signals generated by said memory modules to generate an enable signal at selected ones of its output terminals and to thereby enable each memory module when an address is applied to the memory module which lies within its allocated address space.

2. The memory circuit as recited in claim 1 in which said decoder circuit includes a programmable read-only memory having address terminals connected to receive said size feedback signals and output terminals at which said enabling signals are generated.

3. The memory circuit as recited in claim 1 in which the memory modules each contain a write enable terminal and in which gate means connect to receive a plurality of separate write enable control signals, and said gate means is connected to said decoder circuit output terminals and is responsive to the enabling signals thereon to select one of said write enable control signals and couple it to said memory module write enable terminals.

4. A memory circuit for a programmable machine which comprises:
   a set of memory module connector means;
   an address bus containing m leads, each of which connects with each of said memory module connector means in said set, and n leads which do not;
   a decoder circuit for selectively enabling memory modules, which memory modules are each attached to a respective one of the memory module connector means in said set of memory module connector means, said decoder circuit including:
   a. first input terminals for receiving address signals on said n leads of said address bus and for receiving address signals on at least one of said m leads in said address bus;
   b. second input terminals, each connected to one of said memory module connector means of said set of memory module connector means for receiving size feedback signals from each connector means which indicates the number of separate contiguous addresses required by a memory module which is connected to it; and
   c. output terminals, each connected to one of said memory module connector means of said set of memory module connector means for enabling a memory module connected to one of said connector means to respond to the address signals on the address bus when the address represented by said address signals lies within the address space allocated to that memory module.

5. The memory circuit as recited in claim 4 in which said decoder circuit includes a programmable read-only memory, said first input terminals are a set of most significant address terminals on said programmable read-only memory, said second input terminals are a set of least significant address terminals on said programmable read-only memory, and said output terminals as a set of data terminals on said programmable read-only memory.

6. The memory circuit as recited in claim 4 which includes first gate means connected to receive two separate write enable control signals and being operable to couple one of said two write enable control signals to said set of memory module connector means in response to a logic signal applied to a first gate means input terminal, and second gate means having first inputs connected to said decoder circuit output terminal, second inputs connected to receive said size feedback signals from said memory module connector means and an output terminal connected to said first gate means input terminal.

7. The memory circuit as recited in claim 4 which includes a parity generator circuit having first inputs connected to said decoder circuit output terminals and second inputs connected to receive type feedback signals from said set of memory module connector means, said parity generator being enabled to generate parity data at an output when a memory module requiring parity data is addressed.

8. A memory circuit for receiving a plurality of separate memory modules which vary in the address space they require, the memory circuit including a decoder circuit which is programmed by size feedback signals generated by each memory module such that the decoder circuit will enable each such memory module over a required range of separate addresses allocated to that memory module, and such that the required range of addresses allocated to the respective memory modules are contiguous, and in which said decoder circuit generates enabling signals to the memory modules when an address is applied to them which lies within their allocated address space.

9. The memory circuit as recited in claim 8 in which the decoder circuit is a programmable read-only memory.

* * * * *